United States Patent
Yoda et al.

(10) Patent No.: US 7,418,701 B2
(45) Date of Patent: Aug. 26, 2008

(54) NETWORK DEVICE AND SETUP METHOD THEREOF

(75) Inventors: Yoshiyuki Yoda, Saitama (JP); Yoshihito Oono, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 913 days.

(21) Appl. No.: 10/939,488

(22) Filed: Sep. 14, 2004

(65) Prior Publication Data

US 2005/0204355 A1    Sep. 15, 2005

(30) Foreign Application Priority Data

Mar. 12, 2004  (JP) .............................. 2004-070917
Mar. 22, 2004  (JP) .............................. 2004-082794

(51) Int. Cl.
    G06F 9/45    (2006.01)
(52) U.S. Cl. ..................................................... 717/176
(58) Field of Classification Search ................. 717/176; 714/25
    See application file for complete search history.

(56) References Cited

U.S. PATENT DOCUMENTS

| 6,094,729 | A * | 7/2000 | Mann ........................... 714/25 |
| 6,408,434 | B1 * | 6/2002 | Fujiwara ..................... 717/170 |
| 7,296,187 | B1 * | 11/2007 | Fritz et al. ..................... 714/31 |
| 2004/0153813 | A1 * | 8/2004 | Swoboda ...................... 714/36 |

FOREIGN PATENT DOCUMENTS

| JP | A 2003-114859 | 4/2003 |
| JP | A 2003-202986 | 7/2003 |

* cited by examiner

*Primary Examiner*—John Chavis
(74) *Attorney, Agent, or Firm*—Oliff & Berridge, PLC (57) ABSTRACT

A network device which is connected to a network and provides an information processor on the network with a service, comprising: a network communication unit for communications over the network; a storage medium interface unit for connection with a storage medium into which data can be written; a parameter information storage unit for storing parameter information containing an address for specifying a logical position on the network; a parameter information file creation unit for creating a parameter information file which reflects the parameter information stored by the parameter information storage unit; an installer program storage unit for storing an installer program which executes setup to allow the information processor to use the service; and a storage medium write unit for writing the installer program stored in the installer program storage unit and the parameter information file created by the parameter information file creation unit into a storage medium connected to the storage medium interface unit; wherein: the installer program reads a network address contained in the parameter information file from the storage medium and executes the setup according to the read network address when the storage medium having the installer program and the parameter information file written therein is connected to the information processor.

14 Claims, 9 Drawing Sheets

NETWORK DEVICE AND SETUP METHOD THEREOF

BACKGROUND OF THE INVENTION

1. Technical Field

The present invention relates to a network device and its setup method, and more particularly to a network device and its setup method for providing plural information processors with services over a network.

2. Description of the Related Art

With the development of the network technology in these years, devices such as printers, facsimiles and scanners are provided as network devices accommodating to a network and commonly used by information processors such as plural PCs (Personal Computers) connected to the network.

For example, there is a USB connector which can be used without a troublesome installing work by simply connecting to a computer without using a storage medium such as a CD-ROM (e.g., Japanese Patent Application Laid-Open No. 2003-114859).

Besides, with the development of the network technology, the Web technology used for the Internet or the intranet is also improved, and many information processors have come to operate as Web clients.

Under the circumstances described above, it is made lately that a Web server function is provided within a network device, and various settings of the network device are executed from an information processor which operates as a Web client.

For example, not only the Web server function is used to make various settings but also the device driver of a network device is stored in the network device, and the Web server function is used to provide each terminal device with the device driver (e.g., Japanese Patent Application Laid-Open No. 2003-202986).

But, when the technology described in Japanese Patent Application Laid-Open No. 2003-114859 and the technology described in Japanese Patent Application Laid-Open No. 2003-202986 are used, the device driver to be provided to each information processor is fixed, so that, when the network device is provided with any option, a user who has received the device driver needs to install the device driver on the information processor and executes setting in accordance with the configuration of the network device.

SUMMARY OF THE INVENTION

Accordingly, the present invention provides a network device and its setup method that a user having received a device driver can use the network device by simply installing the device driver without necessity of changing setting in conformity with the configuration of the network device.

According to an aspect of the present invention there is provided a network device which is connected to a network and provides an information processor on the network with a service, comprising: a network communication unit for communications over the network; a storage medium interface unit for connection with a storage medium into which data can be written; a parameter information storage unit for storing parameter information containing an address for specifying a logical position on the network; a parameter information file creation unit for creating a parameter information file which reflects the parameter information stored by the parameter information storage unit; an installer program storage unit for storing an installer program which executes setup to allow the information processor to use the service; and a storage medium write unit for writing the installer program stored in the installer program storage unit and the parameter information file created by the parameter information file creation unit into a storage medium connected to the storage medium interface unit; wherein: the installer program reads a network address contained in the parameter information file from the storage medium and executes the setup according to the read network address when the storage medium having the installer program and the parameter information file written therein is connected to the information processor.

The above-described configuration provides effects that an operation of designating the device address by the user in the setup work can be omitted and, by physically producing a setup medium from the network device itself, the user can surely setup the network device without being conscious of the network address.

According to another aspect of the present invention, there is provided a network device for executing a job according to an instruction from an information processor connected over a network, comprising: a Web server unit which displays a Web page according to a request from a Web client of the information processor; a configuration monitoring unit for monitoring a configuration of the network device; and an installer creation unit for creating an installer of a device driver reflecting the configuration monitored by the configuration monitoring unit; wherein: the Web server unit sends the installer created by the installer creation unit to the information processor according to the request from the Web client.

By constructing as described above, the configuration of the network device is monitored, the installer of the device driver reflecting the monitored configuration is created, and the created installer is sent by the Web server unit to the information processor according to a request from the Web client. Therefore, there is produced an effect that the user having received the installer can install the device driver, which is set according to the configuration of the network device, on the information processor by merely activating the installer.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described in detail with reference to the accompanying figures.

EXAMPLE 1

Example 1 of the present invention will be described with reference to a configuration in that information processors such as PCs (Personal Computers) and network devices are connected over a network.

Figure 1:
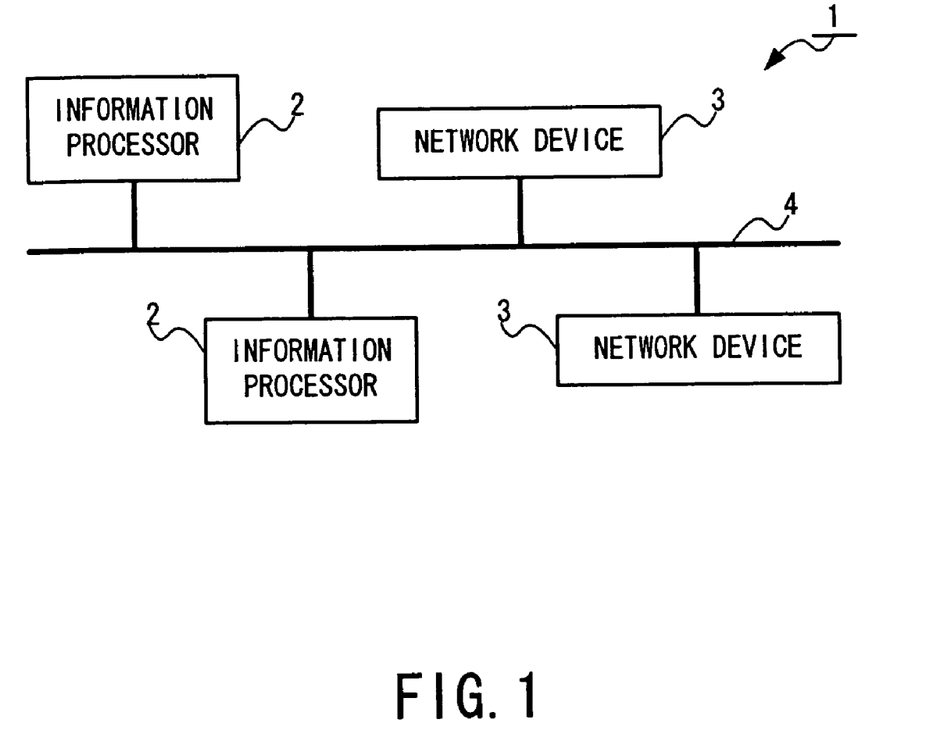
FIG. 1 is a block diagram showing an example of the whole construction of a network device service system 1.

FIG. 1 is a block diagram showing an example of the whole construction of a network device service system 1.

As shown in FIG. 1, the network device service system 1 is configured with plural information processors 2 and plural network devices 3 connected over a network 4. The information processors 2 and the network devices 3 are not always required to be plural.

The network device 3 provides the information processors 2 connected to the network 4 with network services. In the embodiments of the present invention, types of network services are arbitrary (e.g., a storage service, a print service, etc.).

The information processor 2 is an all-purpose electronic computer such as a PC and can use the network services of the network devices 3.

Then, the functional configurations of the network devices 3 and the information processors 2 will be described in detail.

Figure 2:
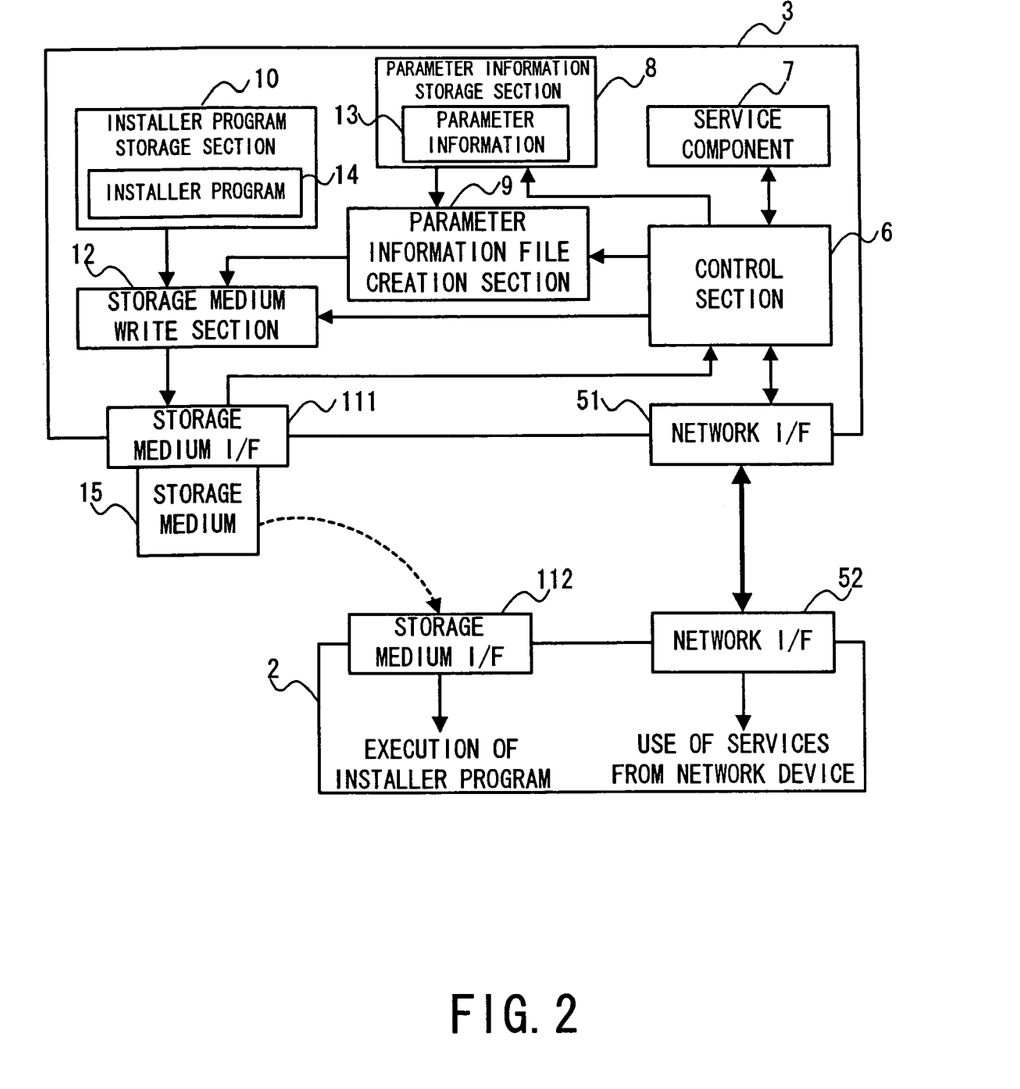
FIG. 2 is a block diagram showing a functional structure of a network device 3 and an information processor 2.

FIG. 2 is a block diagram showing the functional configurations of the network devices 3 and the information processors 2.

The functional configurations of the network devices 3 will be described in detail.

As shown in FIG. 2, the network device 3 is comprised of a network I/F 51, a control section 6, a service component 7, a parameter information storage section 8, a parameter information file creation section 9, an installer program storage section 10, a storage medium I/F 111, and a storage medium write section 12.

The network I/F (interface) 51 is physically connected to the network 4 and provides the information processor 2 with network services over the connected network 4.

The control section 6 executes control processing of the network services and also executes manual setting of a network address (IP address in a TCP/IP network) for specifying the network device 3 on the network 4 or setting by using an automatic network address setting mechanism (e.g., a DHCP [Dynamic Host Configuration Protocol] etc. in the TCP/IP network) to execute processing to connect logically to the network 4 and to update parameter information including the network address and the like. Connection to the network (e.g., a Net BEUI [NetBIOS Extended User Interface] using a MAC [Media Access Control address] address unique to the network device etc.) 4 using a unique address of the network device 3 is made by merely connecting physically.

The service component 7 deals with the network services.

The parameter information storage section 8 stores parameter information 13 including the network address determined by the control section 6 and the set value unique to the network device set in the network device 3.

The parameter information file creation section 9 processes to create a parameter information file reflecting the parameter information 13 stored in the parameter information storage section 8.

The installer program storage section 10 stores an installer program 14 which is a setup program for making the network device 3, which can be executed by a given information processor 2, usable by registering it in an operating system (hereinafter referred to as the OS) stored in the given information processor 2. The installer program 14 has as a resource a unique driver file necessary to use the network device 3 by the information processor 2 other than the function of registering on the OS and also has a function to deploy the pertinent driver file in the storage device within the information processor 2, and a function to read a file system in a medium (any type) where the installer program 14 itself is stored, to read a parameter information file from it and to reflect the content on the setup process. The configuration is not limited to have the installer program storage section 10 built in the network device 3 but it may be configured such that the installer program 14 is stored in a server or the like on the network 4 and taken out from the server as appropriate.

The storage medium I/F 111 is an interface for physical connection to a storage medium 15.

The storage medium write section 12 writes a parameter information file created by the parameter information file creation section 9 and the installer program 14 stored in the installer program storage section 10 into the storage medium 15 connected to the storage medium I/F 111. The type of the storage medium 15 is arbitrary (e.g., when the storage medium 15 is a USB memory, the storage medium write section 12 has a USB host function).

The functional configuration of the information processor 2 will be described in detail.

As shown in FIG. 2, the information processor 2 is physically connected to the network 4 and comprises a network I/F 52 for receiving the network services from the network device 3 through the connected network 4, and a storage medium I/F 112 which is an interface for physical connection to the storage medium 15. The information processor 2 uses an unshown CPU (Central Processing Unit), ROM (Read Only Memory), RAM (Random Access Memory) and HD (Hard Disk) to process data and obtain the network services.

Then, the functional operation executed by the network device 3 when the network device 3 is connected to the network 4 will be described in detail with reference to FIG. 2.

When the network I/F 51 of the network device 3 is connected to the network 4, the control section 6 executes manual setting of a network address or setting by using the automatic network address setting mechanism to connect logically the network device 3 to the network 4, and stores the parameter information 13 containing the network address and the like in the parameter information storage section 8.

Then, the functional operation effected by the network device 3 when the installer program 14 and the parameter information file are written into the storage medium 15 will be described in detail with reference to FIG. 2.

When a user connects the storage medium 15 of a conforming type to the storage medium I/F 111 of the network device 3, the storage medium I/F 111 notifies the connection of the storage medium to the control section 6. The control section 6 having received the notification of the connection of the storage medium gives a parameter information file creation instruction to the parameter information file creation section 9 and also provides the storage medium write section 12 with an instruction for writing of the installer program 14 and the parameter information file into the storage medium 15. The method of notifying about the connection of the storage medium may be any method. For example, the user can push a button to notify the control section 6 about the connection of the storage medium.

The parameter information file creation section 9, when receiving an instruction for creation of the parameter information file, reads the parameter information 13, which is currently set in the network device itself, from the parameter information storage section 8, creates a parameter information file which reflects the read parameter information 13, and gives the created parameter information file to the storage medium write section 12.

Upon receiving the instruction of writing the installer program 14 and the parameter information file into the storage medium 15, the storage medium write section 12 reads the installer program 14 from the installer program storage section 10 and writes the read installer program 14 and the parameter information file received from the parameter information file creation section 9 into the storage medium 15 via the storage medium I/F 11.

And, the network device 3 notifies the user of the completion of writing of the installer program 14 and the parameter information file into the storage medium 15 by any method (e.g., indication on a panel). The user takes the storage medium 15 from the storage medium I/F 111 and connects the taken storage medium 15 to the storage medium I/F 112 of the information processor 2 intended to use the network device 3. The user activates the installer program 14 stored in the storage medium 15 or the installer program 14 is automatically activated by an automatic play function or the like possessed by the OS stored in the information processor 2. The activated installer program 14 reads the parameter information file from the storage medium 15 and executes setup of the network device 3 according to the network address or the like contained in the read parameter information file.

Therefore, the information processor 2 having completed the setup of the network device 3 can receive the network services provided by the network device 3 via the network I/F 52.

Figure 3:
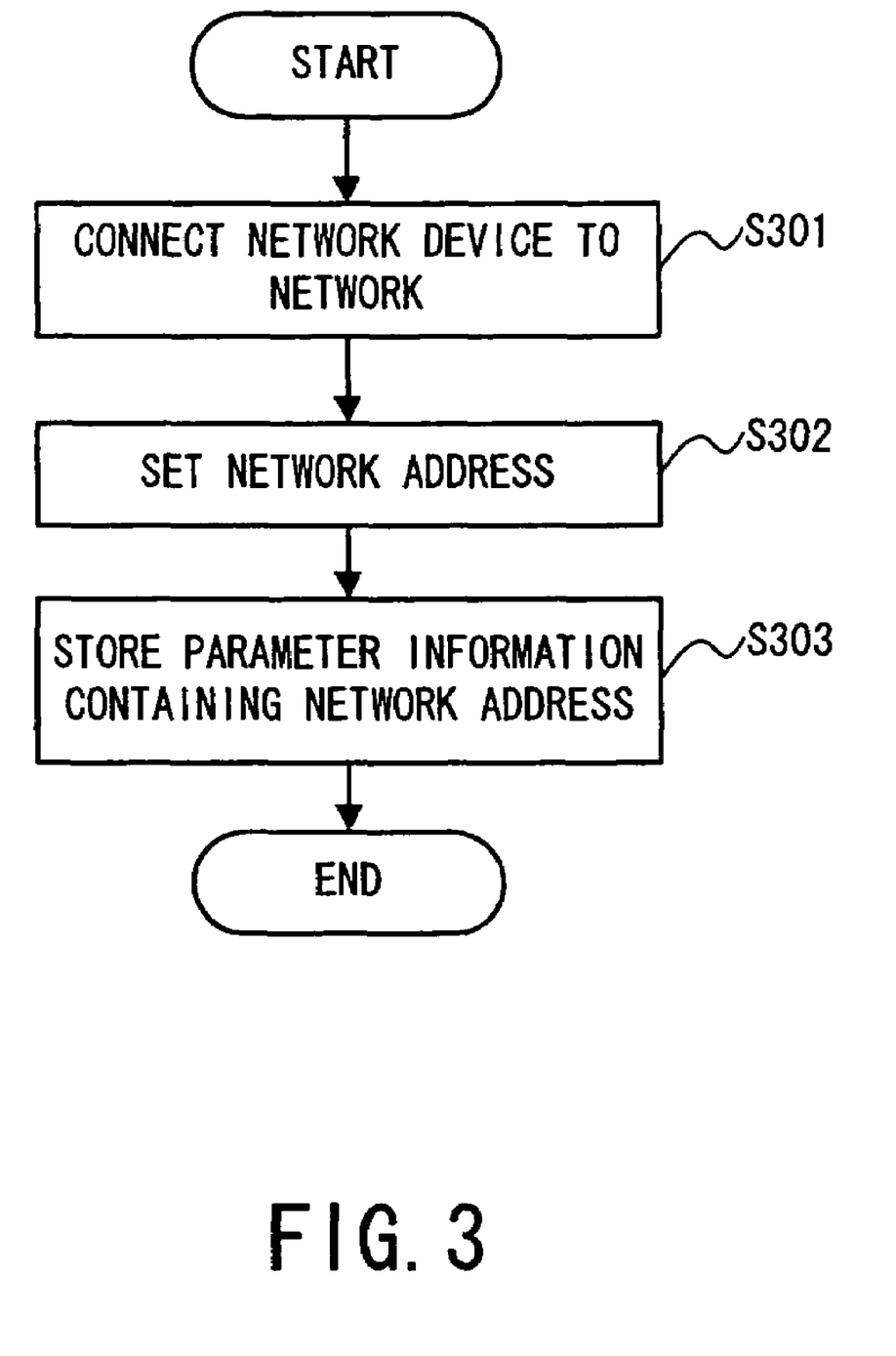
FIG. 3 is a flow chart showing a procedure of parameter information setting processing executed by the network device 3 when the network device 3 is connected to a network 4.

Then, the procedure of the parameter information setting processing executed by the network device 3 when the network device 3 is connected to the network 4 will be described with reference to the flow chart shown in FIG. 3.

The network device is connected to the network (step S301), the network address is set (step S302), parameter information containing the set network address is stored (step S303), and the parameter information setting processing is terminated.

Figure 4:
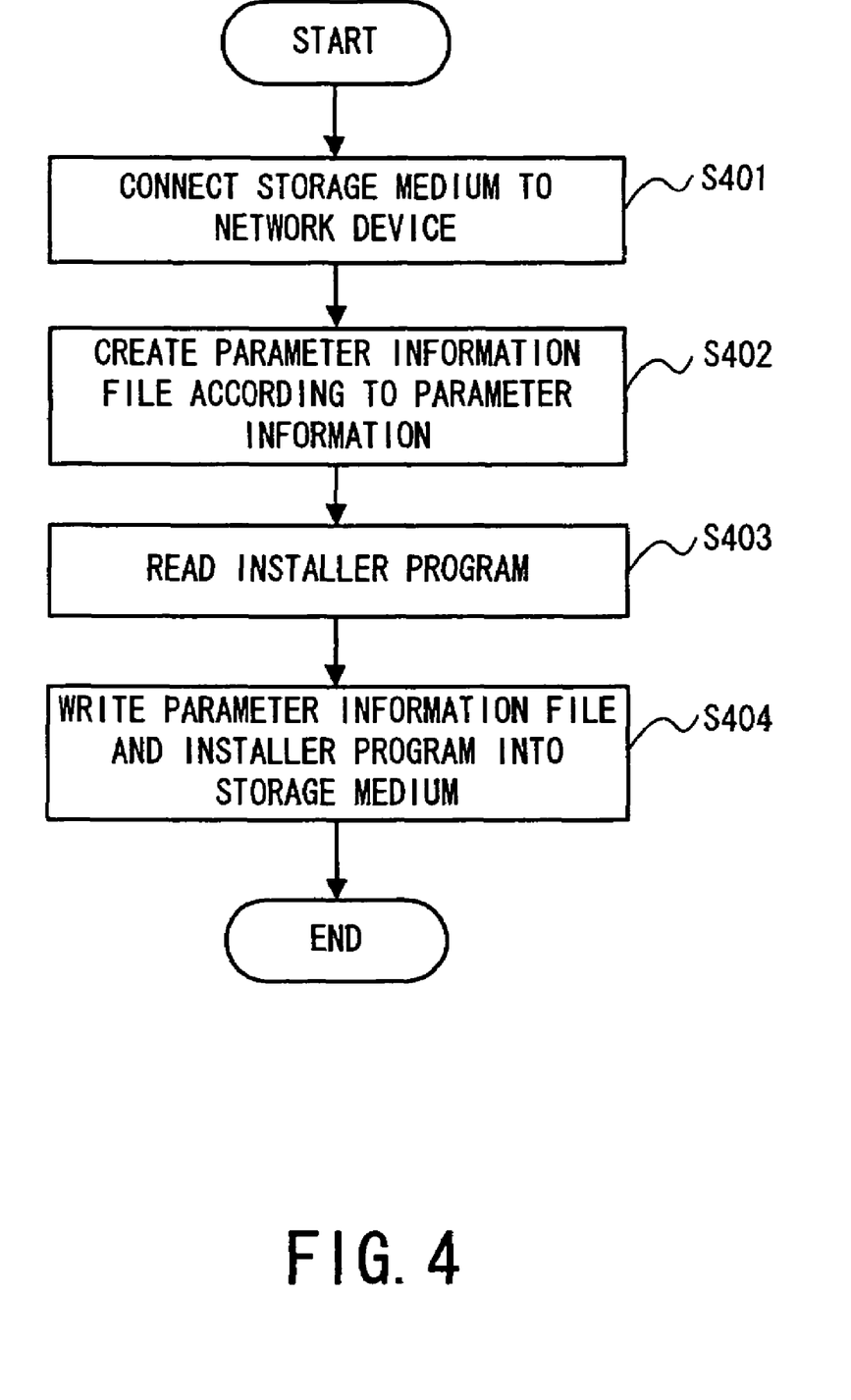
FIG. 4 is a flow chart showing write processing executed by the network device 3 when an installer program 14 and a parameter information file are written into a storage medium 15.

Then, the write processing executed by the network device 3 at the time of writing the installer program 14 and the parameter information file into the storage medium 15 will be described with reference to the flow chart shown in FIG. 4.

The storage medium is connected to the network device (step S401), the parameter information file is created according to the parameter information (step S402), the installer program is read (step S403), the parameter information file and the installer program are written into the storage medium (step S404), and the writing processing is terminated.

The present invention is not limited to the configuration of the above-described example in that the parameter information file is created when the installer program 14 is written into the storage medium 15 but can also be applied to a configuration in that a parameter information file is previously created and stored. In such a case, as timing of creating the parameter information file, there may be applied a configuration in that a default file is stored at the time of shipping of the network device 3, a configuration in that a parameter information file is created and stored after turning on the network device 3, a configuration in that the parameter information file once created at the time of writing into the storage medium 15 is stored, or the like. In addition, as parameter information file update timing, there may be applied a configuration in that update is made as required at the time of change in the parameter setting of the network device 3, a configuration in that, at the time of writing in the storage medium, the parameter setting of that time is updated, or the like.

EXAMPLE 2

Figure 5:
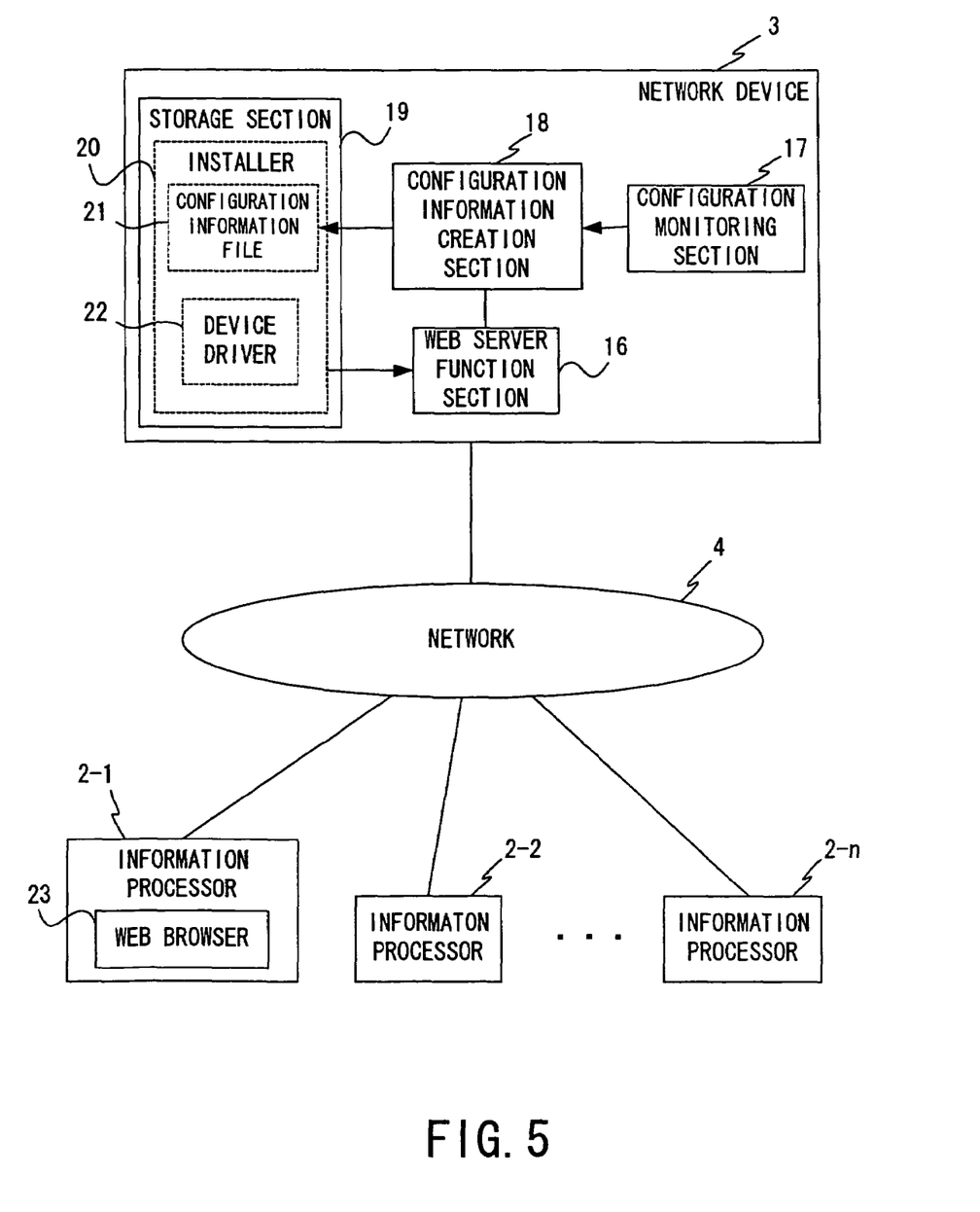
FIG. 5 is a diagram showing a functional structure of the network device of Example 2 and a configuration example of a network including the network device.

FIG. 5 is a diagram showing a functional structure of the network device of Example 2 and a configuration example of a network including the network device.

As shown in FIG. 5, the network device 3 is connected to plural information processors 2 (2-1 to 2-n) through the network 4.

The network device 3 is a network device such as a printer, a facsimile, a scanner or the like and commonly used by the individual information processors 2.

The information processors 2 are computers such as PCs (personal computers) and can execute a variety of processing by running a variety of application software. And, the information processor 2 has a Web browser 23 installed as one of the application software. The computer configuring the information processor 2 and the Web browser 23 are for general-purpose use. The information processors 2-2 to 2-n have the Web browser 23 omitted in FIG. 5 but actually have the Web browser 23 installed in the same manner as the information processor 2-1.

Here, the configuration of the network device 3 will be described. As shown in FIG. 5, the network device 3 has a Web server function section 16, a configuration monitoring section 17, a configuration information creation section 18, and a storage section 19.

The Web server function section 16 operates as a Web server and provides the Web browser 23 and the like with various types of Web pages including a device driver download page.

The configuration monitoring section 17 monitors the configuration of options and the like mounted on the network device 3. Various options are mounted on the network device 3. For example, when the network device 3 is a printer, the options are an expanded memory, a tray, a double-sided unit and the like, and when the network device 3 is a scanner, the options are an expanded memory, an ADF (Automatic Document Feeder) and the like.

According to the instruction from the Web server function section 16, the configuration information creation section 18 creates configuration information indicating the configuration of the network device 3 being monitored by the configuration monitoring section 17.

The storage section 19 stores page information (not shown) on individual Web pages displayed by the Web server function section 16 and an installer 20 for installing a device driver of the network device 3. The installer 20 includes a configuration information file 21 recording the configuration information created by the configuration information creation section 18 and a device driver 22 corresponding to the network device 3. The installer 20 is an executable file, so that the device driver 22 is installed in the information processor 2 by executing the installer 20 by the information processor 2, and setting is made according to the configuration information recorded in the configuration information file 21.

Figure 6:
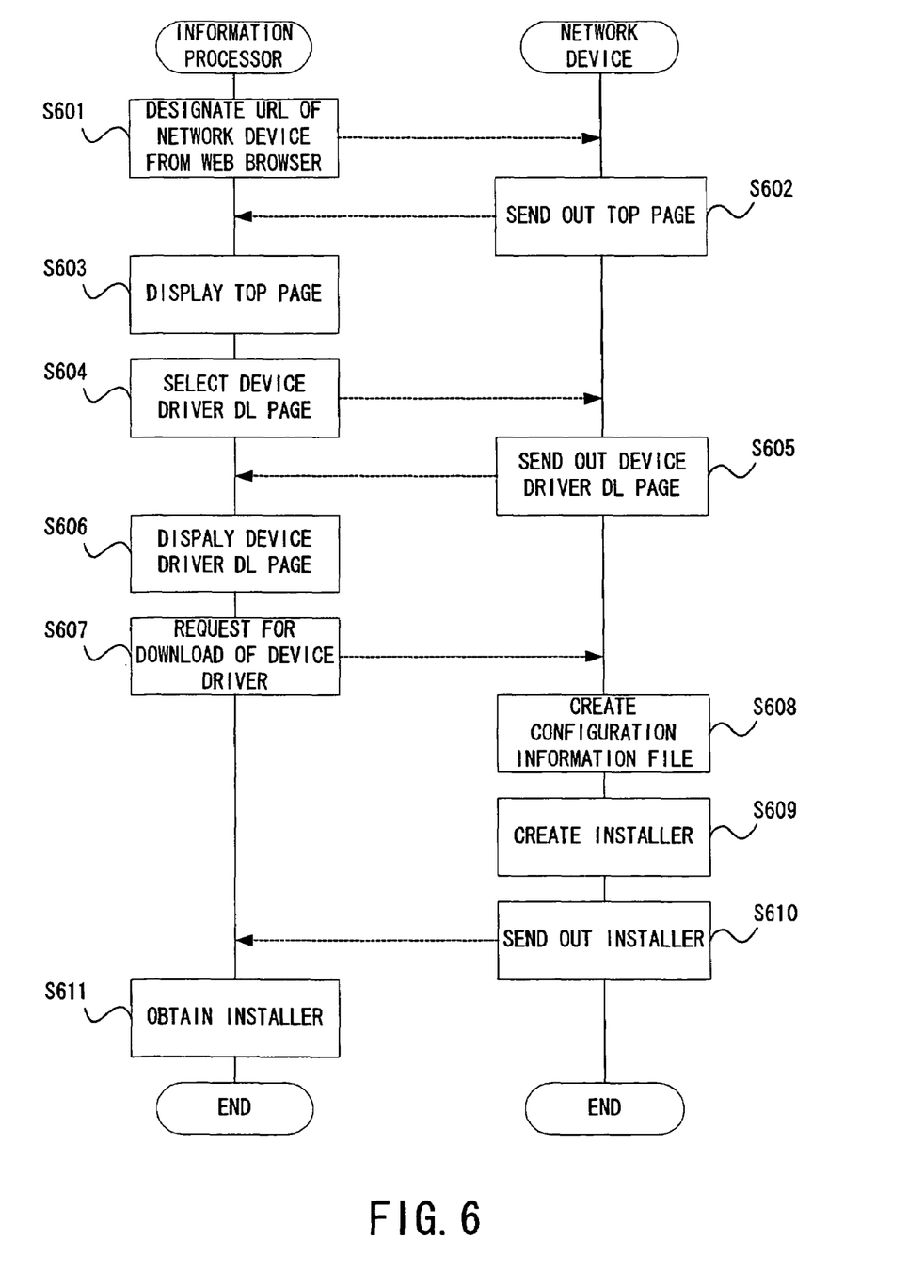
FIG. 6 is a flow chart showing a flow of device driver provision processing in Example 2.

Then, a flow of device driver provision processing in the configuration shown in FIG. 5 will be described. FIG. 6 is a flow chart showing the flow of device driver provision processing in Example 2.

In the device driver provision processing, a user operates to designate a URL of the network device 3 on the Web browser 23 of the information processor 2 (step S601), and the Web browser 23 accesses the Web server function section 16 of the network device 3.

Subsequently, the Web server function section 16 responds and sends information for displaying a top page to the Web browser 23 (step S602), and the Web browser 23 displays the top page (step S603). The top page shows information on the network device 3 and a link to a page for instruction of processing.

Then, the user operates the Web browser 23 and selects a link to the download page of the device driver (step S604), the Web server function section 16 responds and sends information for displaying the device driver download page to the Web browser 23 (step S605), and the Web browser 23 displays the device driver download page (step S606).

When the user demands to download a device driver from the device driver download page (step S607), the Web server function section 16 having received the demand operates the configuration information creation section 18. The configuration information creation section 18 creates configuration information according to the configuration of the network device 3 monitored by the configuration monitoring section 17 and records in the configuration information file 21 (step S608) and creates the installer 20 including the configuration information file 21 (step S609). The processing by the configuration information creation section 18 is actually a processing to rewrite the configuration information file 21 as necessary.

When the installer 20 is created by the configuration information creation section 18, the Web server function section 16 sends the installer 20 to the Web browser 23 (step S610), the Web browser 23 obtains the installer 20 to store it into the information processor 2 (step S611), and the device driver provision processing is terminated.

When the installer stored in the information processor 2 is later activated by the user, the installer installs the device driver 22 in the information processor 2, and makes setting to the device driver 22 according to the configuration information recorded in the configuration information file 21.

EXAMPLE 3

Figure 7:
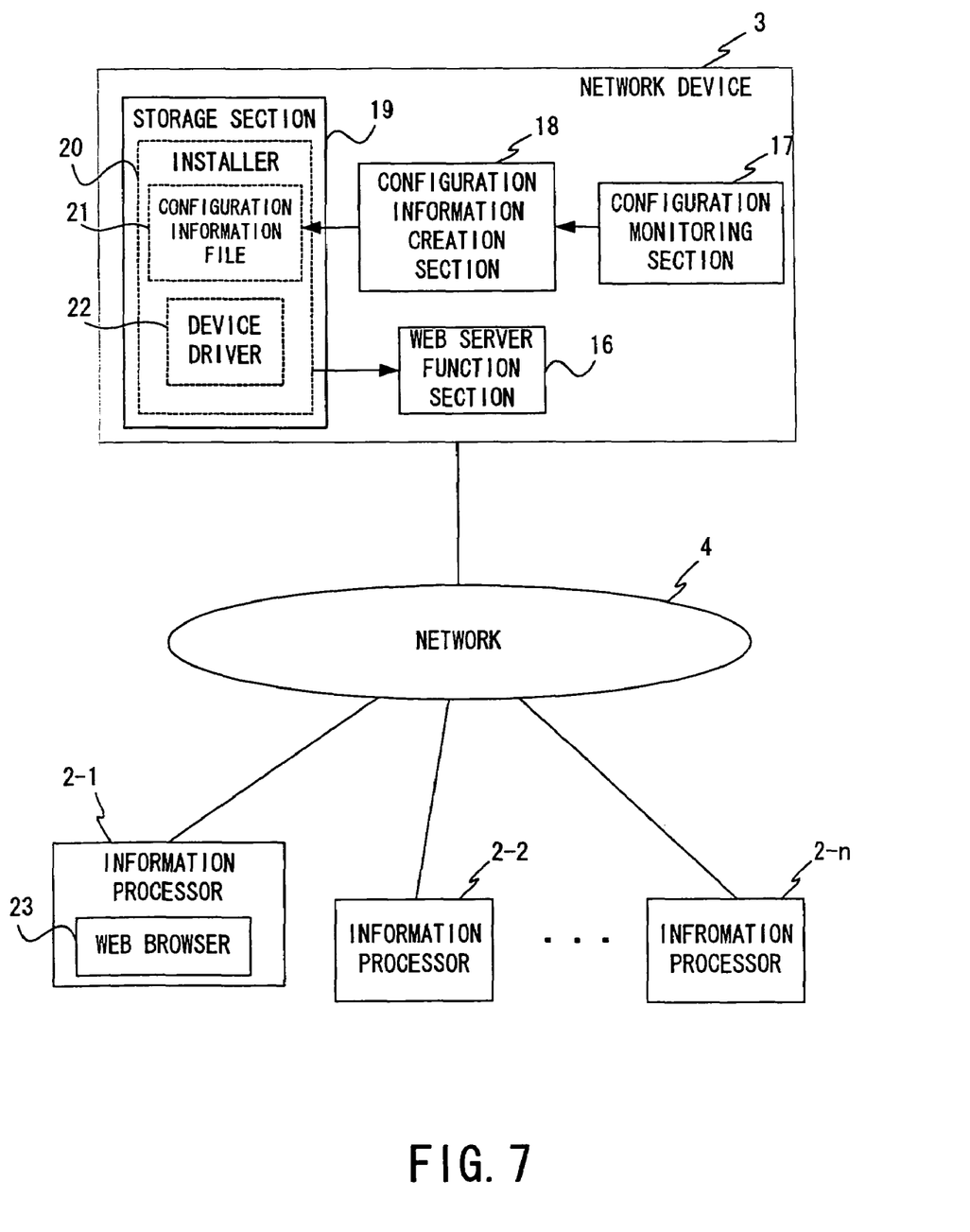
FIG. 7 is a diagram showing a functional structure of the network device in Example 3 and a configuration example of a network including the network device.

FIG. 7 is a diagram showing a functional structure of the network device in Example 3 and a configuration example of a network including the network device.

As shown in FIG. 7, the network device 3 is connected to plural information processors 2 (2-1 to 2-n) over the network 4.

The network device 3 is a network device such as a printer, a facsimile, a scanner or the like and commonly used by the individual information processors 2.

The information processors 2 are computers such as PCs (personal computers) or the like and can execute a variety of processing by operating a variety of application software. The information processor 2 has the Web browser 23 installed as one of the application software. The computer configuring the information processor 2 and the Web browser 23 are for general-purpose use. The information processors 2-2 to 2-n have the Web browser 23 omitted in FIG. 7 but actually have the Web browser 23 installed in the same manner as the information processor 2-1.

Here, the configuration of the network device 3 will be described. As shown in FIG. 7, the network device 3 has a Web server function section 16, a configuration monitoring section 17, a configuration information creation section 18, and a storage section 19.

The Web server function section 16 operates as a Web server and provides the Web browser 23 and the like with various types of Web pages including a device driver download page.

The configuration monitoring section 17 monitors the configuration of options and the like mounted on the network device 3. Various options are mounted on the network device 3. For example, when the network device 3 is a printer, the options are an expanded memory, a tray, a double-sided unit and the like, and when the network device 3 is a scanner, the options are an expanded memory, an ADF (Automatic Document Feeder) and the like.

When the configuration monitoring section 17 detects that the configuration of the network device 3 is changed, the configuration information creation section 18 creates configuration information indicating the configuration of the network device 3 according to the detected result.

The storage section 19 stores page information (not shown) of individual Web pages indicated by the Web server function section 16 and an installer 20 for installing a device driver of the network device 3. The installer 20 includes a configuration information file 21 recording the configuration information created by the configuration information creation section 18 and a device driver 22 corresponding to the network device 3. The installer 20 is an executable file, so that the device driver 22 is installed in the information processor 2 by executing the installer 20 by the information processor 2, and setting is made according to the configuration information recorded in the configuration information file 21.

Figure 8:
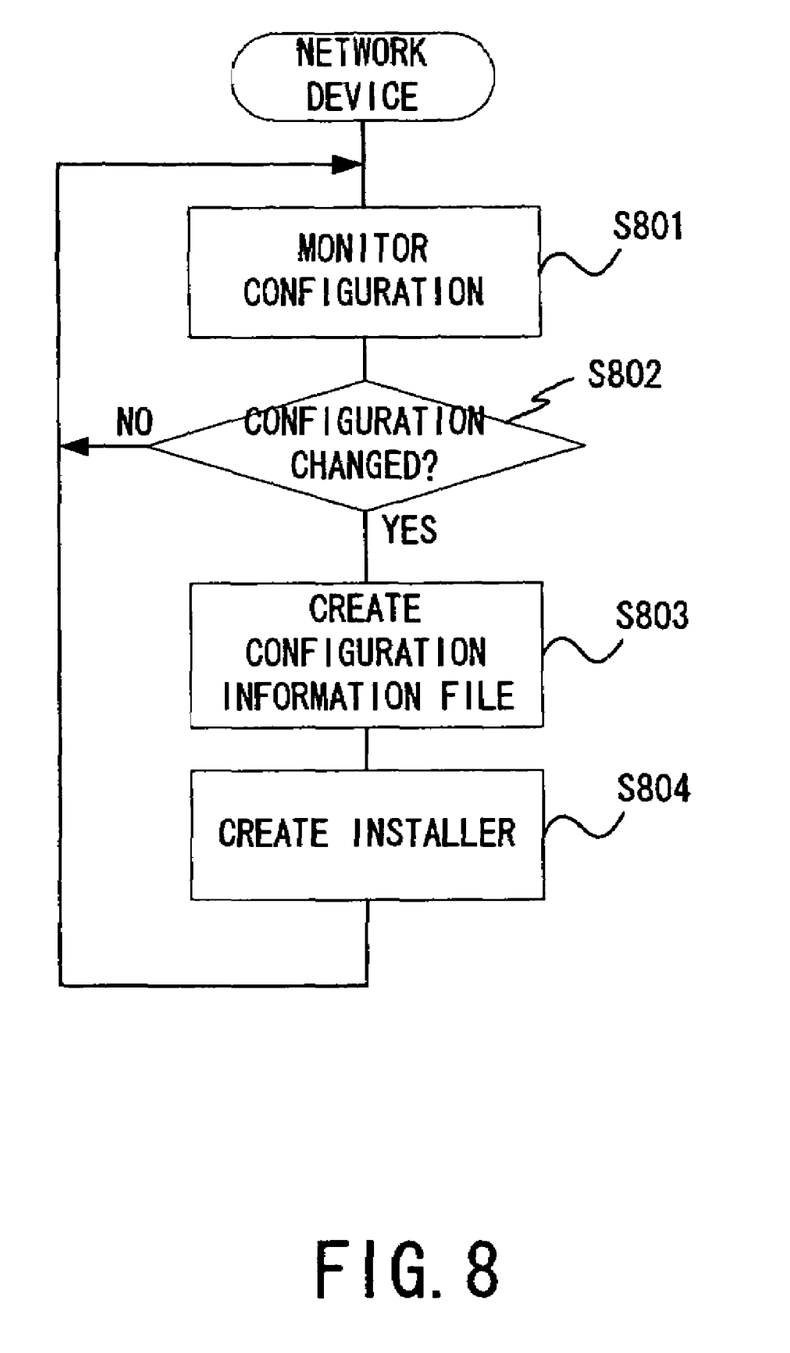
FIG. 8 is a flow chart showing a flow of device driver provision processing in Example 3.
Figure 9:
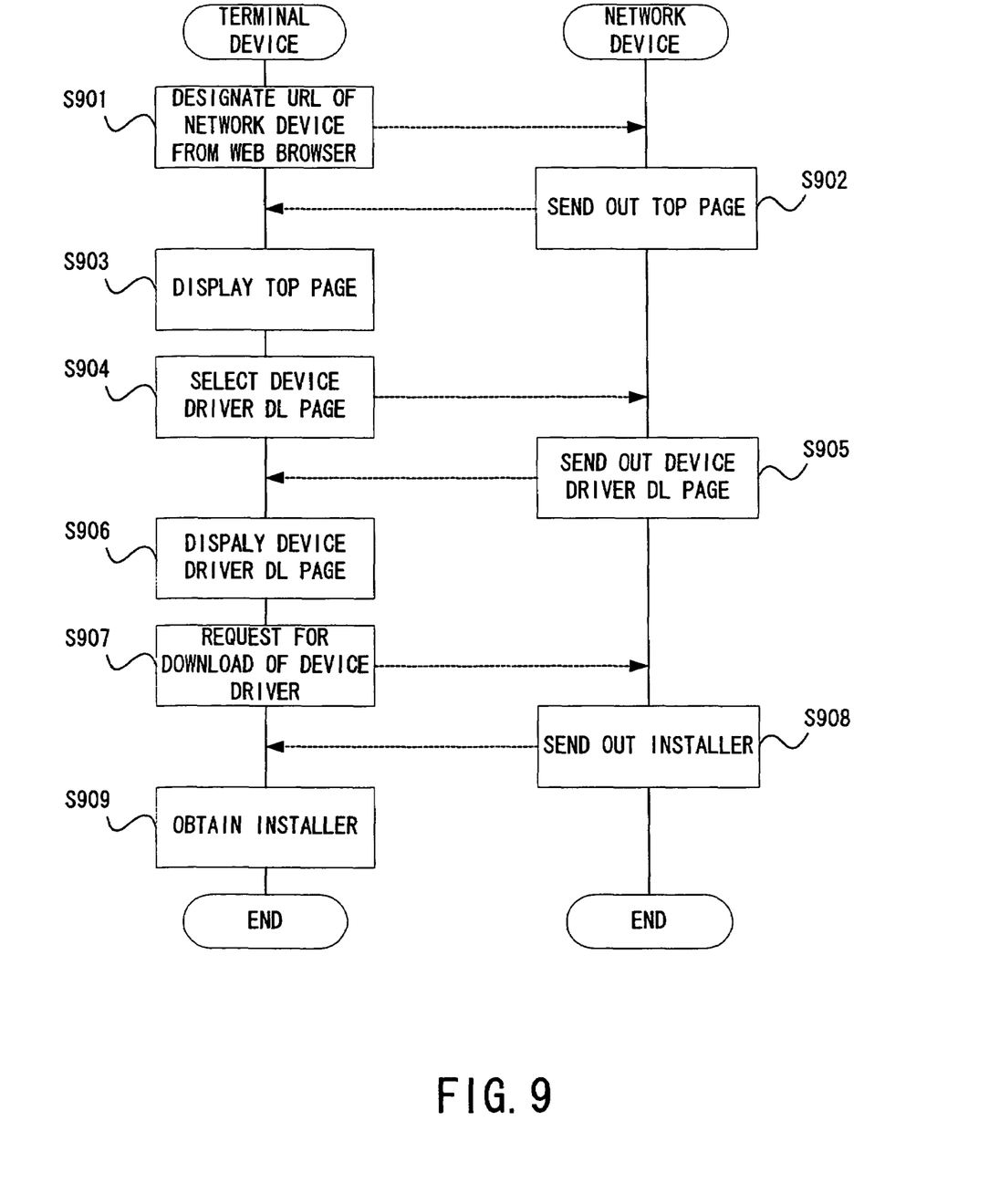
FIG. 9 is a flow chart showing a flow of device driver provision processing in Example 3.

Then, a flow of device driver provision processing in the configuration shown in FIG. 7 will be described. FIG. 8 and FIG. 9 are flow charts showing the flows of device driver provision processing in Example 3.

In the device driver provision processing of Example 3, the network device 3 always monitors the configuration and executes the installer creation processing according to the monitored result.

In this processing, the configuration monitoring section 17 of the network device 3 monitors the configuration of the network device 3 (step S801) and, when it detects that the configuration is changed (YES in step S802), the configuration information creation section 18 is operated.

According to the change in the configuration detected by the configuration monitoring section 17, the configuration information creation section 18 creates configuration information, records it in the configuration information file 21 (step S803) and creates the installer 20 containing the configuration information file 21 (step S804). The processing by the configuration information creation section 18 is actually a processing to rewrite the configuration information file 21 as necessary.

In the actual processing of providing a device driver, a user operates to designate a URL of the network device 3 on the Web browser 23 of the information processor 2 (step S901), and the Web browser 23 accesses the Web server function section 16 of the network device 3.

Subsequently, the Web server function section 16 responds and sends information for displaying a top page to the Web browser 23 (step S902), and the Web browser 23 displays the top page (step S903). The top page shows information about the network device 3 and a link to a page for instruction of processing.

Then, the user operates the Web browser 23 to select a link to the download page of the device driver (step S904), the Web server function section 16 responds and sends information for displaying the device driver download page to the Web browser 23 (step S905), and the Web browser 23 displays the device driver download page (step S906).

When the user demands to download the device driver from the device driver download page (step S907), the Web server function section 16 having received the demand sends the installer 20 stored in the storage section 19 to the Web browser 23 (step S908). The Web browser 23 obtains the installer 20 and stores in the information processor 2 (step S909), and the device driver provision processing is terminated.

Because the installer stored in the information processor 2 is created by the configuration information creation section 18 when the configuration of the network device 3 is changed, it installs the device driver 22 in the information processor 2 when activated later by the user and performs setting to the device driver 22 according to the configuration information recorded in the configuration information file 21.

When the configuration of the network device in Example 1 and the configuration of the network device in Example 2 or Example 3 are combined to setup a network device to the information processor, it is also possible to apply a configuration in that an installer is installed via the storage medium to setup the network device and, when a device driver is later installed due to a change in the configuration of the network device, the installer sent by the Web server function section is installed over the network, so that the device driver, which is set in accordance with the change in the configuration of the network device, is installed.

What is claimed is:

1. A network device which is connected to a network and provides an information processor on the network with a service, comprising:
    a network communication unit for communications over the network;
    a storage medium interface unit for connection with a storage medium into which data can be written;
    a parameter information storage unit for storing parameter information containing an address for specifying a logical position on the network;
    a parameter information file creation unit for creating a parameter information file which reflects the parameter information stored by the parameter information storage unit;
    an installer program storage unit for storing an installer program which executes setup to allow the information processor to use the service; and
    a storage medium write unit for writing the installer program stored in the installer program storage unit and the parameter information file created by the parameter information file creation unit into a storage medium connected to the storage medium interface unit; wherein:
    the installer program reads a network address contained in the parameter information file from the storage medium and executes the setup according to the read network address when the storage medium having the installer program and the parameter information file written therein is connected to the information processor.

2. The network device according to claim 1, wherein the parameter information file creation unit creates the parameter information file at the time of writing the installer program to the storage medium connected to the storage medium interface unit.

3. A network device for executing a job according to an instruction from an information processor connected over a network, comprising:
    a Web server unit which displays a Web page according to a request from a Web client of the information processor;
    a configuration monitoring unit for monitoring a configuration of the network device; and
    an installer creation unit for creating an installer of a device driver reflecting the configuration monitored by the configuration monitoring unit; wherein:
    the Web server unit sends the installer created by the installer creation unit to the information processor according to the request from the Web client.

4. The network device according to claim 3, wherein the installer creation unit comprises a configuration information creation unit for creating configuration information which shows the configuration being monitored by the configuration monitoring unit, and creates an installer containing the configuration information created by the configuration information creation unit and the device driver.

5. The network device according to claim 3, wherein the installer creation unit creates the installer when the Web server unit receives the request from the Web client.

6. The network device according to claim 3, wherein the installer creation unit creates the installer when the configuration monitoring unit detects a change in the configuration.

7. The network device according to claim 3, wherein the configuration is the presence or not of an option to be mounted on the network device.

8. A setup method of a network device at an information processor on a network, wherein the network device:
    stores an installer program for executing setup of the network device at the information processor to allow the information processor to use a service provided by the network device;
    creates a parameter information file which reflects parameter information containing an address for specifying a logical position on the network; and
    when a storage medium into which data can be written is connected to the network device, writes the installer program and the parameter information file into the storage medium; and
    the installer program:
    when the storage medium having the installer program and the parameter information file written therein is connected, reads a network address contained in the parameter information file from the storage medium; and
    executes the setup of the network device at the information processor according to the read network address.

9. The setup method of a network device according to claim 8, wherein the parameter information file is created when the installer program is written into the storage medium.

10. A setup method of a network device which executes a job according to an instruction from an information processor connected over a network and includes a Web server unit which displays a Web page in response to a request from a Web client of the information processor; comprising:
    monitoring a configuration of the network device;
    creating an installer of a device driver reflecting the configuration being monitored; and
    sending the created installer to the information processor by the Web server unit in accordance with the request from the Web client.

11. The setup method of a network device according to claim 10, wherein the installer contains the device driver and configuration information indicating the configuration.

12. The setup method of a network device according to claim 10, wherein the installer is created when the Web server unit receives the request from the Web client.

13. The setup method of a network device according to claim 10, wherein the installer is created when a change in the configuration is detected by the monitoring.

14. The setup method of a network device according to claim 10, wherein the configuration is the presence or not of an option to be mounted on the network device.

* * * * *